April 16, 1929.   C. S. WATKINS   1,709,641
TIRE CARRIER WITH LOCKING DEVICE
Filed Jan. 11, 1923

Witnesses    Inventor
Clayton Stuart Watkins

Patented Apr. 16, 1929.

1,709,641

UNITED STATES PATENT OFFICE.

CLAYTON STUART WATKINS, OF WICHITA FALLS, TEXAS.

TIRE CARRIER WITH LOCKING DEVICE.

Application filed January 11, 1923. Serial No. 612,021.

The invention comprehends a tire carrier preferably equipped with a locking device and comprising a support securely attached to some fixed part of a vehicle. A rim carrier wheel which may be in the form of a dummy wheel is arranged on said support, said wheel having a clamping device arranged thereon to hold a tire rim securely thereto.

Another object of the invention is to provide a device of this nature which is very simple and practical and can be quickly operated, eliminating all possibility of losing the spare tire and rim.

Another object of the invention is to provide a device of this character which is very practical and can be manufactured and sold at a very nominal cost.

The nature and advantages of the invention will be better understood when the following detail description is read in connection with the accompanying drawing, forming a part of this application. The invention residing in the construction, combination and arrangement of parts as claimed.

Figures 1, 2:
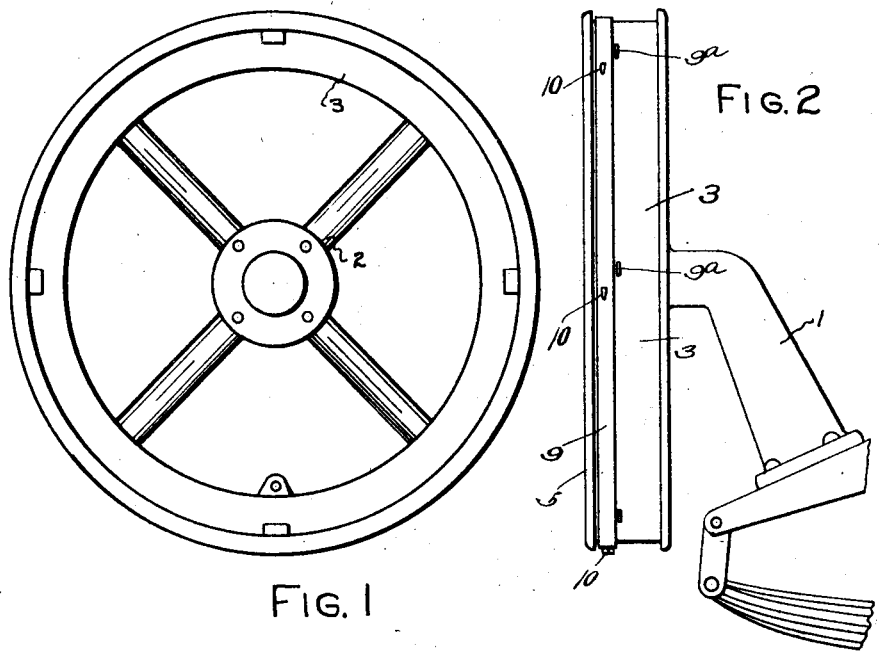
Figure 1 is a rear view in which is shown an illustrative embodiment of the invention.
Figure 2 is a side view of the tire carrier.

As shown the reference numeral 1 represents a bracket support or arm rigidly secured to some fixed portion of a vehicle. Permanently secured to the arm is a rim carrier 2, the periphery 3 of which is preferably of channeled section. The carrier may be shaped to simulate a vehicle wheel as herein shown. The carrier is designed to support a tire rim 6 which may be of any suitable design, the carrier being modified in certain details to conform to the construction of the particular rim. As shown the periphery of the carrier which for convenience may be referred to as a felloe or felloe band comprises an annular base and side flanges 4 and 5, the flange 4 being suitably curved at its outer portion to conform to the curvature of the rim 6. The rim is also provided with a flange as 7, which, when the rim is in position upon the carrier, bears upon the flange 5 of the carrier. Said rim is also provided with a plurality of locking lugs 8 arranged at spaced intervals upon the inner face of rim 6, said lugs 8 providing means for engaging the rim 6 upon a wheel and ordinarily being formed integral with said rim.

Figures 3, 4:
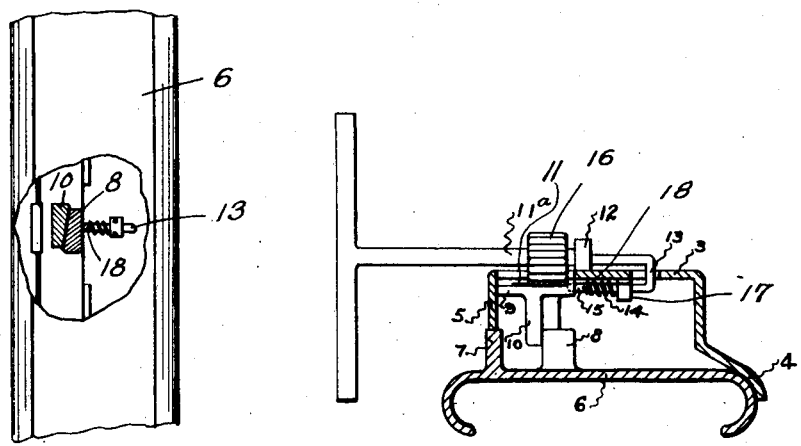
Figure 3 is a view of the same showing the arrangement of the clamping lugs.
Figure 4 is a view showing the general assembly of the rim clamping mechanism.

For the purpose of securing the tire rim 6 to the carrier a circumferentially movable locking ring or band 9 is rotatably mounted in the carrier. Said band 9 is preferably disposed in felloe 3 closely adjacent to flange 5 and may be secured against axial displacement, when not coextensive with felloe 3, by suitable guide lugs, designated 9$^a$ in Figure 2. In the arrangement shown the ring or band 9 and the tire rim 6 are spaced apart a considerable distance so that there is normally no friction between these two members. When the rim has been placed in position upon the carrier and it is desired to secure the same against accidental removal, the ring may be rotated by any suitable means, thus bringing into engagement the wedging or locking devices herein described as arranged upon adjacent faces of the rim and ring respectively. As shown the ring is provided with a plurality of lugs or dogs 10 preferably arranged at intervals on the outer face thereof. The corresponding wedging lugs 8 arranged on the rim are adapted to cooperate with the lugs 10 when the ring is rotated in the proper direction. As shown in Fig. 3 the contacting faces of the lugs 8 and 10 are directed at a slight angle to the plane of the carrier, whereby a wedging action is obtained on rotation of the ring, the rim 6 being thus moved laterally and tightly secured to the channeled periphery or felloe 3 of the carrier. The parts may be readily released by merely rotating the ring 9 in the opposite direction, thus disengaging the lugs 8 and 9.

Any suitable means for rotating the ring 9 may be employed. Preferably a rack 11, or plurality of teeth, are arranged upon the inner surface of the ring 9 which rack is adapted to cooperate with a gear or pinion 16 carried by a removable wrench 11$^a$. One end of the wrench 11$^a$ is shown as supported for the purposes of rotation incident to engagement with rack 11 and movement of band 9 in a fixed bracket or support 12 securely attached to the felloe 3.

For the purpose of locking the ring 9 against rotation and to prevent accidental removal of the spare tire and rim a locking device generally designated by the numeral 13 is provided. As shown the locking device comprises a piece of round metal bent to U shape. One leg of the U is inserted through an elongated slot in the base of the felloe 3 and passes through a suitable guide lug 17 formed on one face of the felloe while the end of the other leg is inserted in the wrench supporting lug 12. A coil spring 14 arranged on one leg of the U shaped locking device serves to hold the same in contact with the ring 9 which is preferably provided with a plurality of holes 15 arranged in the side thereof and adapted to receive the end of the locking device. As shown, one end of the spring 14 bears against the lug 17 and the other against a pin 18 formed in the locking device 13.

To unlock the ring it is only necessary to insert the wrench 11 in the support 12 thereby moving the locking member 13 against the tension of the spring 14 to the position shown in Fig. 4 thus releasing the ring 9, which may then be rotated by the means of the gear 16 carried by the wrench 11.

While an illustrative embodiment of the invention is herein described in detail it is evident that many changes in the structure may be made without departing from the spirit of the invention which is to be limited only by the appended claims.

What I claim is:

1. The combination with a circular tire rim carrier, and a tire rim adapted to be releasably secured to the carrier, of a circumferentially rotatable ring mounted on the carrier and adapted to prevent or permit removal of the rim from the carrier according to the position of the ring, and a concealed locking device for said ring comprising a spring pressed catch, one leg of which engages said ring and the other is slidable in a bracket mounted on a fixed portion of the carrier.

2. The combination with a circular tire rim carrier, and a tire rim adapted to be releasably secured to the carrier, of a circumferentially rotatable ring mounted on the carrier and adapted to prevent or permit removal of the rim from the carrier according to the position of the ring, and a spring pressed catch of U shape, one leg of which engages the ring, the other leg being slidable in a bracket secured to a fixed portion of the carrier, said catch being operable by said ring operating means.

3. The combination with a rim carrier, of a tire rim detachably associated with said carrier, cooperating means on said rim and carrier to effect engagement therebetween in a predetermined position, spring impelled means for normally maintaining said rim locked to said carrier, and means for imparting relative movement to said rim and carrier, thereby simultaneously releasing said spring impelled means.

CLAYTON STUART WATKINS.